United States Patent
Algie

(10) Patent No.: US 7,283,551 B1
(45) Date of Patent: Oct. 16, 2007

(54) TECHNIQUE FOR IMPLEMENTING AN ADD/DROP COLLECTOR FOR SUPPORTING DEDICATED AND SHARED TIMESLOTTING

(75) Inventor: Glenn Algie, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1242 days.

(21) Appl. No.: 10/291,602

(22) Filed: Nov. 12, 2002

Related U.S. Application Data

(63) Continuation-in-part of application No. 10/254,861, filed on Sep. 26, 2002.

(60) Provisional application No. 60/364,024, filed on Mar. 15, 2002.

(51) Int. Cl.
  *H04B 7/212* (2006.01)
(52) U.S. Cl. .................. 370/442; 370/468; 370/458
(58) Field of Classification Search ............ None
  See application file for complete search history.

(56) References Cited

U.S. PATENT DOCUMENTS 6,091,740 A * 7/2000 Karasawa .............. 370/458
6,141,355 A   10/2000 Palmer et al.
6,243,364 B1 * 6/2001 Pihlaja .................. 370/294
6,246,702 B1  6/2001 Fellman et al.
2001/0043622 A1 * 11/2001 Bernath et al. ......... 370/516

FOREIGN PATENT DOCUMENTS

WO    WO 01/93498 A2    12/2001

* cited by examiner

*Primary Examiner*—Bob A. Phunkulh
(74) *Attorney, Agent, or Firm*—Hunton & Williams LLP

(57) ABSTRACT

A technique for implementing a tunable add/drop collector having at least two bursting ports for supporting dedicated and shared timeslotting in a point to consecutive point environment is disclosed. In one embodiment, the technique is realized by method for implementing a tunable add/drop collector for supporting dedicated and shared timeslotting in a network having a plurality of nodes comprising the steps of computing an add/drop burst schedule for scheduling timeslots wherein the timeslots comprise a plurality of dedicated timeslots and a plurality of shared timeslots; receiving timeslot control information at one or more nodes and transmitting data flows from the one or more nodes via at least two timeslotted ports in accordance with at least the timeslot control information and the add/drop burst schedule.

20 Claims, 14 Drawing Sheets

| Destination 1310 | Port 1312 | L2, L3, L4 filters/mask 1314 | Timeslotid Filter 1316 |
|---|---|---|---|
| Me | A1 | Allowed | TU1 |
| Af | A3<br>A3 | Allowed | Not applicable<br>Not applicable |
| Bg<br>Bh | A2 | Allowed if from F, 974<br>Not allowed if from M, 970 | TD5<br>TD5 |
| Ci | A2 | Allowed if from F, 974<br>Not allowed if from M, 970 | TD5<br>TD5 |

Figure 13

TECHNIQUE FOR IMPLEMENTING AN ADD/DROP COLLECTOR FOR SUPPORTING DEDICATED AND SHARED TIMESLOTTING

CROSS-REFERENCE TO RELATED APPLICATIONS

This patent application claims priority from U.S. Provisional Patent Application No. 60/364,024 filed Mar. 15, 2002, which is hereby incorporated by reference herein in its entirety.

This patent application is a continuation-in-part of U.S. patent application Ser. No. 10/254,861, filed Sep. 26, 2002, which is hereby incorporated by reference herein in its entirety.

FIELD OF THE INVENTION

The present invention relates generally to add/drop timeslotting and, more particularly, to a technique for implementing a tunable add/drop collector having at least two bursting ports for supporting dedicated and shared timeslotting in a point to consecutive point environment.

BACKGROUND OF THE INVENTION

Time Division Multiplexing is a scheme in which a plurality of signals are combined for transmission on a single communications line or channel. Each signal is broken up into a plurality of segments having a short duration. A circuit that combines signals at a source end of a communications link is known as a multiplexer. The multiplexer accepts input signals from a first plurality of end users, breaks each input signal into segments, and assigns the segments to a composite signal in a rotating, repeating sequence. Therefore, the composite signal contains data from each of the first plurality of end users. At a destination end, the composite signal is separated into the input signal segments by a circuit known as a demultiplexer. The separated input signal segments are then routed to a second plurality of end users.

TDM data flows may be transmitted in a native format and time bursted over a first mile Ethernet drop (one or multiple hops) along with regular Ethernet traffic. Time bursting generally involves an intermittent asynchronous transmission of a specific amount of data for a specific amount of time.

Currently, packetization of TDM data flows is required for transmission. However, packetization of TDM data flow is costly per bit. Two current methods involve packetized Time Division Multiplexing over Internet Protocol (TDMoIP) and native TDM on physical layer (PHY) sideband.

For TDMoIP, packetizing TDM data flows requires greater hardware and software invested solutions thereby raising costs to first mile outstations (e.g., customer premise equipments). Further, clocking in TDMoIP requires extensive computing resources, such as multiple steps of packetization, latency and jitter dynamic input/output (i/o) buffering, encapsulation into User Datagram Protocol (UDP), Internet Protocol (IP) and Ethernet, and management overheads of associated tiered address space, for example. Therefore, TDMoIP is not cost effective or efficient for metro networking on Synchronous Optical Network (SONET).

For native TDM on PHY sideband, investments in a modified Ethernet PHY are required to support passthrough TDM sideband, as current PHYs will not support this functionality. Thus, a new PHY upgrade to existing systems is needed.

Computer network traffic generally encompasses traffic from telephone, video as well as other time-sensitive sources. As conventional computer networks are not adequately designed to handle such real-time traffic, collisions and congestion oftentimes lead to delays and other inefficiencies. In Ethernet applications, the use of variable packet sizes and carrier sense multiple access with collision detect (CSMA/CD) for link access and control creates an unpredictable and less controllable environment for assuring quality of service.

Ethernet over Sonet/SDH may use a more traditional means of carrying packets on an add/drop collector where traditional circuit oriented TDM flows may be carried in native format. This concept of adding Ethernet transport into a Sonet/SDH infrastructure comes with adding complexity and higher cost to add/drop devices used for collector network purposes.

In view of the foregoing, it would be desirable to provide a technique for implementing a tunable add/drop collector having at least two bursting ports for supporting dedicated and shared timeslotting which overcomes the above-described inadequacies and shortcomings. More particularly, it would be desirable to provide a technique for implementing a tunable add/drop collector having at least two bursting ports for supporting dedicated and shared timeslotting in an efficient and cost effective manner.

SUMMARY OF THE INVENTION

According to the present invention, a technique for implementing a tunable add/drop collector having at least two bursting ports for supporting dedicated and shared timeslotting is provided. In one exemplary embodiment, the technique is realized by a method for implementing a tunable add/drop collector for supporting dedicated and shared timeslotting in a network having a plurality of nodes, the method comprising the steps of: computing an add/drop burst schedule for scheduling timeslots wherein the timeslots comprise a plurality of dedicated timeslots and a plurality of shared timeslots; receiving timeslot control information at one or more nodes; and transmitting data flows from the one or more nodes via at least two timeslotted ports in accordance with at least the timeslot control information and the add/drop burst schedule.

In accordance with other aspects of this exemplary embodiment of the present invention, the method further comprises the timeslotted information received by a directed unicast message intended for a single node; the timeslotted information received by a multicast message intended to be received by a plurality of nodes; each of the one or more nodes comprise a Burst MAC device; the plurality of dedicated timeslots and the plurality of shared timeslots are dynamically tunable; the at least two timeslotted ports are connected to a headend supporting TDMoSONET/SDH; the tunable add/drop collector resides in a point to consecutive point environment; the data flows are transmitted at least in part in accordance with a bridge table wherein the bridge table comprises timeslot information; and wherein the bridge table is automatically updated during a link failure condition to an alternate timeslot map.

In another exemplary embodiment, the technique is realized by at least one signal embodied in at least one carrier wave for transmitting a computer program of instructions configured to be readable by at least one processor for instructing the at least one processor to execute a computer process for performing the method as recited above.

In another exemplary embodiment, the technique is realized by a system for implementing a tunable add/drop collector for supporting dedicated and shared timeslotting in a network having a plurality of nodes, the system comprising: a burst schedule for computing an add/drop burst schedule for scheduling timeslots wherein the timeslots comprise a plurality of dedicated timeslots and a plurality of shared timeslots; one or more nodes for receiving timeslot control information; and at least two timeslotted ports for transmitting data flows from the one or more nodes in accordance with at least the timeslot control information and the add/drop burst schedule.

In accordance with other aspects of this exemplary embodiment of the present invention, the system further comprises the timeslotted information received by a directed unicast message intended for a single node; the timeslotted information received by a multicast message intended to be received by a plurality of nodes; wherein each of the one or more nodes comprise a Burst MAC device; wherein the plurality of dedicated timeslots and the plurality of shared timeslots are dynamically tunable; wherein the at least two timeslotted ports are connected to a headend supporting TDMoSONET/SDH; wherein the tunable add/drop collector resides in a point to consecutive point environment; wherein the data flows are transmitted at least in part in accordance with a bridge table wherein the bridge table comprises timeslot information; and wherein the bridge table is automatically updated during a link failure condition to an alternate timeslot map.

In another exemplary embodiment, the technique is realized by an article of manufacture for implementing a tunable add/drop collector for supporting dedicated and shared timeslotting in a network having a plurality of nodes, the article of manufacture comprising at least one processor readable carrier; and instructions carried on the at least one carrier; wherein the instructions are configured to be readable from the at least one carrier by at least one processor and thereby cause the at least one processor to operate so as to: compute an add/drop burst schedule for scheduling timeslots wherein the timeslots comprise a plurality of dedicated timeslots and a plurality of shared timeslots; receive timeslot control information at one or more nodes; and transmit data flows from the one or more nodes via at least two timeslotted ports in accordance with at least the timeslot control information and the add/drop burst schedule.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 13 is an example of a bridge table with timeslot mapping information in accordance with the present invention.

DETAILED DESCRIPTION OF EXEMPLARY EMBODIMENT(S)

The present invention provides an efficient method for carrying bursted native media data flows over a standard Ethernet point-to-point (pt-pt) physical layer (PHY) by introducing a TDM Burst Media Access Control (MAC) device that resides between a Standard Ethernet MAC and a Standard Ethernet PHY. The Standard Ethernet MAC and TDM Burst MAC each have unique MAC addresses. The TDM Burst MAC allows unframed native TDM data flows to be bursted onto an Ethernet First Mile (EFM) where packetization of TDM is avoided. According to an embodiment of the present invention, burst grants for TDM and Ethernet flows may be signaled using 802.3x pause signals in a predetermined sequence. According to another embodiment of the present invention, burst signals may be implemented in place of pause signals to signal burst grants.

Figure 1:
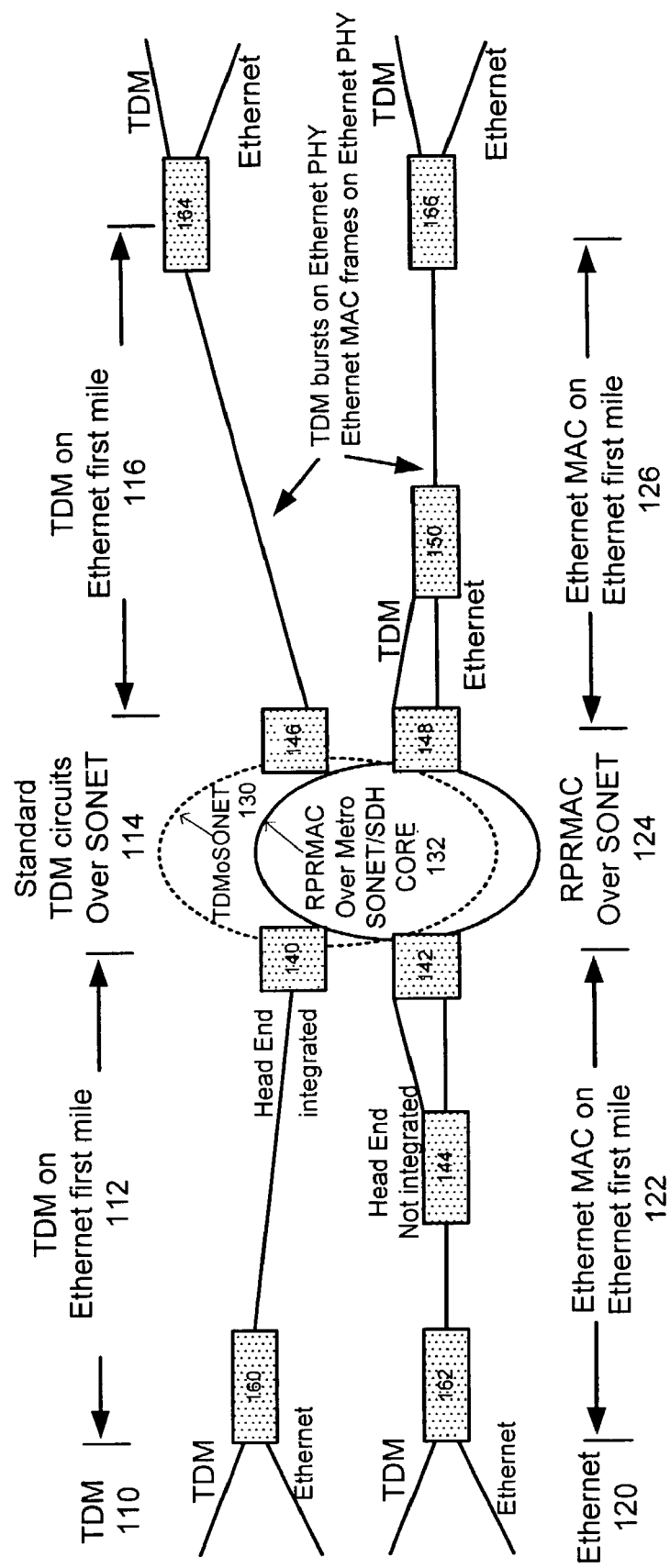
FIG. 1 is a system for delivering bursted native media data flows over an Ethernet first mile in accordance with the present invention.

FIG. 1 is a system for delivering bursted native media data flows over a first mile Ethernet in accordance with the present invention. Bursted native media data flows may refer to TDM data flows, video data flows and/or any other digitized byte-oriented stream, etc. For example, the present invention supports a technique for efficiently transporting TDM data flows over a SONET network via native Ethernet first mile metro extensions. TDM/SDH may also be supported by an embodiment of the present invention. While TDM data flows are discussed in exemplary embodiments, other bursted native media data flows may be implemented in accordance with the embodiments of the present invention. TDM data flows may be carried natively rather than adding packetizing resources. A TDM data flow may be bursted onto Ethernet first mile hops where a second hop may be SONET. Standard 802.3x pause signals may be used for a burst cycle. In addition, burst signals may be used for a burst cycle. Bursted TDM data flows may interwork into a metro Optical Ethernet (OE) on SONET to a standard TDM on SONET (TDMoSONET) 130. Interwork refers to connecting at least two types of media at a point in a network that connects a first layer to a second layer, such as 140, 142, 146 and 148.

As shown in FIG. 1, head-end devices may be integrated (e.g., 140, 146) or not-integrated (e.g., 142 and 144, 148 and 150). Nodes 160, 162, 164, 166 may transmit/receive TDM data flows and Ethernet frames. Head-end devices generally represent a point of presence (POP) location, which may be controlled by a central office. For example, a head-end device may include a wiring closet or an extension of a central office used by a metro provider. Nodes may include circuits or other device with a TDM interface and an Ethernet interface. Native TDM data flows may feed into a TDMoSONET 130. Ethernet frames may feed into Resilient Packet Ring Media Access Control (RPRMAC) or Ethernet over SONET (EOS) using X.86 or generic framing protocol (GFP) encapsulation techniques or other techniques. For example, as Synchronous Optical Network/Synchronous Data Hierarchy (SONET/SDH) is available in a core of a metro network 132, TDM data flows may be passed a hop or two and interworked into a standard TDMoSONET 130. For TDM transmissions, as shown by 110, TDM data flows may burst on EFM as represented by 112 and 116, where first mile transmission are fed into standard TDM circuits over SONET 114. For Ethernet transmissions, as shown by 120, Ethernet frames on EFM are represented by 122 and 126, where first mile transmissions are fed to RPRMAC over SONET 124. TDM data flows bursted on Ethernet PHY and Ethernet frames on Ethernet PHY may be supported at an EFM.

Figure 2:
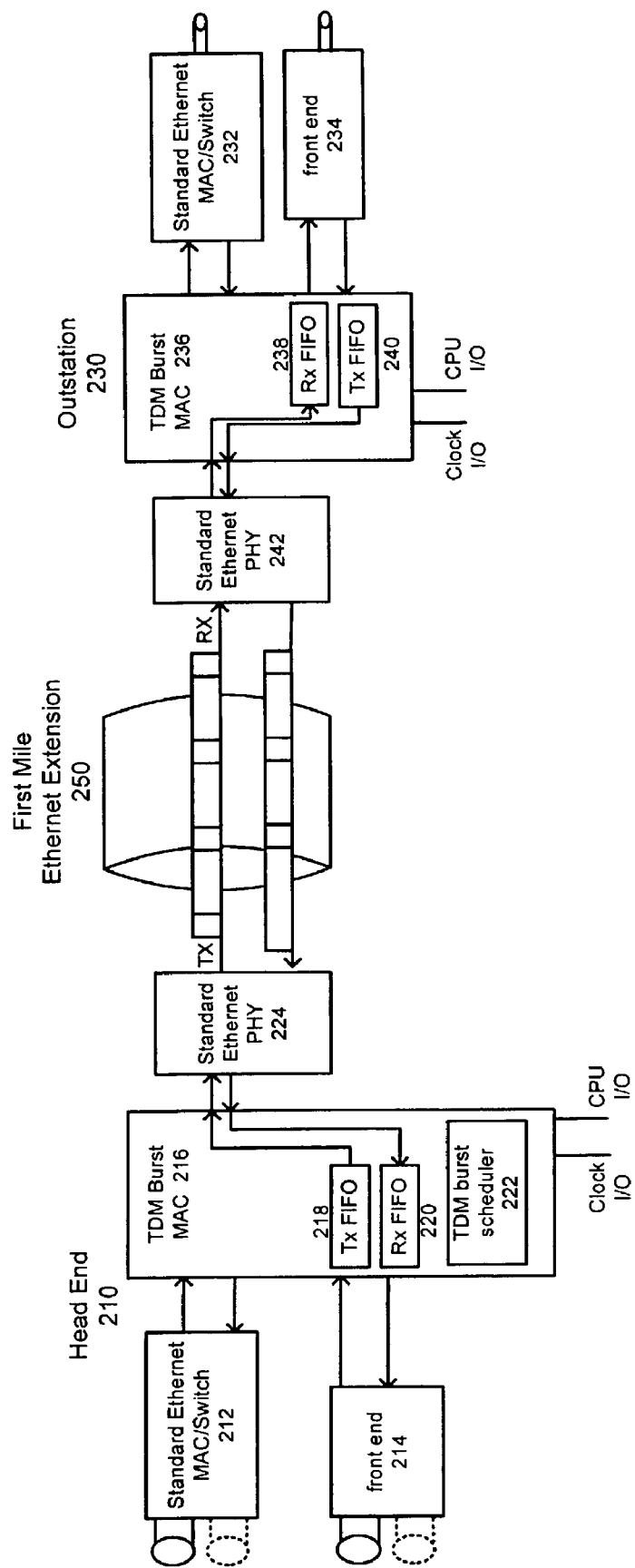
FIG. 2 is a system for supporting head-end to outstation TDM burst operations in accordance with the present invention.

FIG. 2 is a system for supporting head-end 210 to outstation 230 TDM burst operations in accordance with the present invention. An outstation generally represents a customer premise equipment. At head-end 210, TDM Burst MAC 216 is positioned between Standard Ethernet MAC/Switch 212 and Standard Ethernet PHY 224. When TDM Burst MAC 216 operates in a default bypass mode, Standard Ethernet PHY 224 is in communication with Standard Ethernet MAC/Switch 212. When TDM Burst MAC 216 is in an "on" position, Standard Ethernet PHY 224 is in communication with front end 214 via Transmit (Tx) First In First Out (FIFO) 218 and Receive (Rx) FIFO 220. At head-end 210, TDM Burst MAC 216 also supports a TDM burst scheduler 222 for scheduling pause signals (or burst signals) as well as TDM burst transmissions. TDM Burst scheduler 222 may be integrated with TDM Burst MAC 216. In addition, TDM Burst scheduler 222 may function as a separate software layer, decoupled from TDM Burst MAC 216. Ethernet frames may interwork to RPRMAC over SONET, X.86 EOS (or generic framing protocol), and/or native Ethernet. TDM may interwork to TDMoSONET 130, TDM Burst MAC ((pt-pt), point to consecutive point timeslotting (pt-cpt), or point to multipoint timeslotting (pt-mpt)) and other ring and/or mesh options.

At a First Mile Ethernet Extension 250, Standard Ethernet PHY 224 and Standard Ethernet PHY 242 transmit and receive Ethernet frames and TDM data flows in accordance with pause signals in a predetermined sequence. In another example, burst signals may be implemented in place of pause signals.

At outstation 230, TDM Burst MAC 236 is positioned between Standard Ethernet MAC/Switch 232 and Standard Ethernet PHY 242. When TDM Burst MAC 236 operates in a default bypass mode, Standard Ethernet PHY 242 is in communication with Standard Ethernet MAC/Switch 232. When TDM Burst MAC 236 is in an "on" position, Standard Ethernet PHY 242 is in communication with front end 234 via Rx FIFO 238 and Tx FIFO 240.

The present invention leverages Standard Ethernet PHY layers and Standard Ethernet MAC layers to integrate a TDM Burst MAC between these layers at an EFM when TDM transport is desired by an end user. This approach avoids redesigning and/or restructuring existing Ethernet structures.

The present invention integrates a TDM Burst MAC that has a default bypass mode and resides between a Standard Ethernet MAC and a Standard Ethernet PHY, such as 10/100 Media Independent Interface (MII), Gigabit Ethernet (GigE) Serdes, Gigabit Ethernet Interface Card (GBIC), Gigabit MII (GMII) or other hardware connecting a Standard Ethernet MAC to a Standard Ethernet PHY.

With dynamic control data, alignment may be timed between two endpoints or multiple linear cascaded endpoints on the EFM (where each endpoint is equipped with a TDM BURST MAC) to a regular burst window in a time domain where a set of steps described below in FIG. 6 occur per burst cycle. This control data may be signaled at a per burst cycle or as burst events of the Standard Ethernet MAC. In addition, the TDM burst MAC may be remotely managed by a Simple Network Management Protocol (SNMP) type provisioning control, for example.

The present invention may be implemented as an upstream operation at an outstation or at an intermediate cascaded node (e.g., towards a network, rather than towards an end user). For example, downstream burst control may be reflected upstream at an outstation where source/destination MAC addresses are updated as appropriate.

Figure 3:
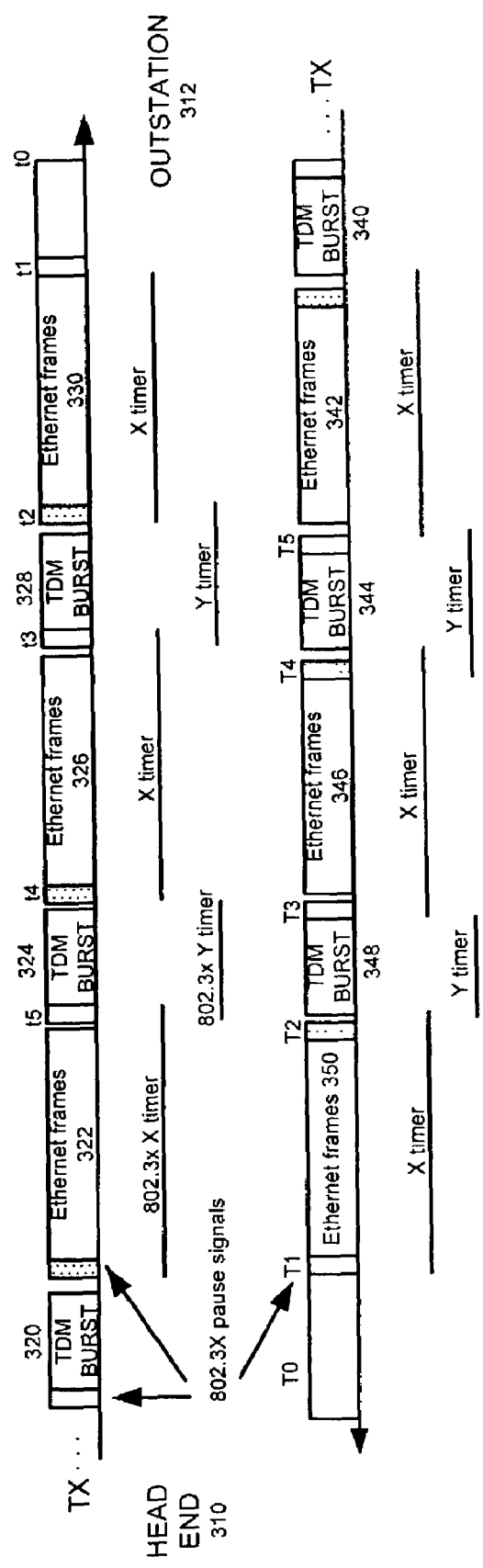
FIG. 3 shows downstream and upstream TDM bursting in accordance with the present invention.

FIG. 3 shows downstream and upstream TDM bursting in accordance with the present invention. X timer represents a 802.3x directed pause of X time to a destination MAC address of TDM Burst MAC. Y timer represents a 802.3x multicast pause of Y time to a 802.3x multicast address. The X timer is processed by a TDM Burst MAC, such as 216 and 236, and the Y timer is processed by a Standard Ethernet MAC, such as 212 and 232 of FIG. 2.

Time t0 to t1 represents an initialization stage where TDM Burst MAC operates in a bypass mode. Upon receipt of a directed pause to a TDM Burst MAC address at time t1 at outstation 312, TDM Burst MAC operates in a bypass mode during a 802.3x pause time having value X. Ethernet frames 330 are transmitted until X timer pops at time t2. X may have an additional guard band time Gx.

Upon receipt of a multicast pause at a Standard Ethernet MAC at time t2, Ethernet MAC runs in a disabled mode during a 802.3x pause time having value Y. TDM Burst MAC transmits native TDM Burst 328 to/from Ethernet PHY until Y timer pops at time t3. Y timer may have an additional guard band time Gy. From time t3 to t4, Standard Ethernet MAC transmits Ethernet frames 326 to/from Ethernet PHY. At time t4, another multicast pause may be received to disable Standard Ethernet MAC. From time t4 to t5, TDM Burst MAC transmits TDM data flows (e.g., TDM bursts 324) until Y timer pops at time t5.

As shown in FIG. 3, T1, T2, T3, etc. are reflections of a t1, t2, t3, etc. pattern where source/destination MAC addresses are updated appropriately.

According to another embodiment of the present invention, burst signals may be used in place of pause signals, as shown in FIG. 3 above. In this embodiment, burst signals may represent an "on" signal while a pause signal may represent an "off" signal. Timer X in a burst signal may represent a time for Ethernet MAC to burst and timer Y in a burst signal may represent a time for TDM Burst MAC to send, which may be directed to one or more MAC addresses appropriately. A burst signal may also comprise a transmit duration for indicating how long a transmission will last. By implementing burst signals, guard band time may be minimized since a transmitting outstation, for example, may accurately shut down upstream, rather than additionally having to potentially spool a maximum size packet. By minimizing guard band time, efficiency is further enhanced. Implementing burst signals in place of pause signals is discussed in PCT Application No. PCT/GB01/02395 (Publication No. WO01/93498), filed May 25, 2001, which is incorporated by reference in its entirety.

Figure 4:
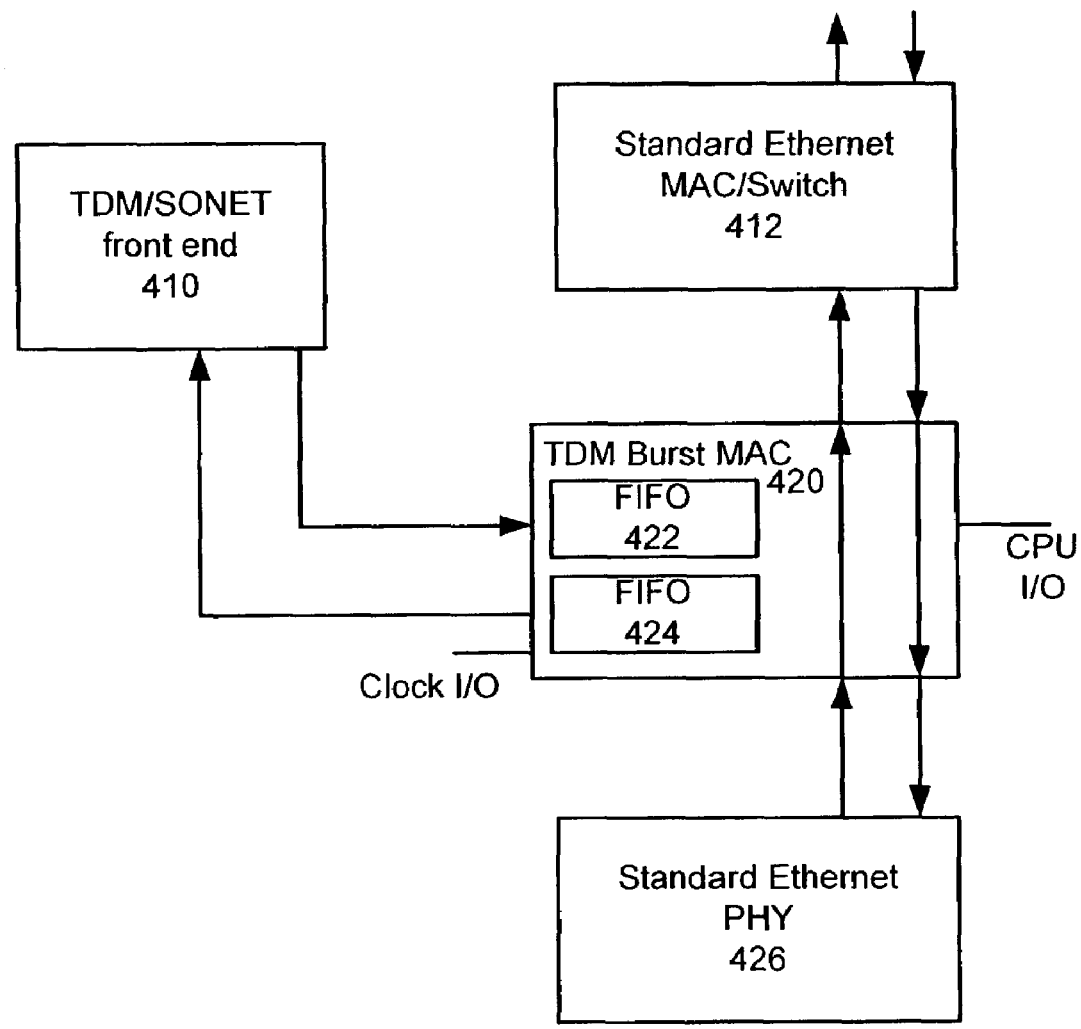
FIGS. 4 and 5 illustrate an Ethernet First Mile transport side at an outstation for supporting a TDM Burst MAC in accordance with the present invention.
Figure 5:
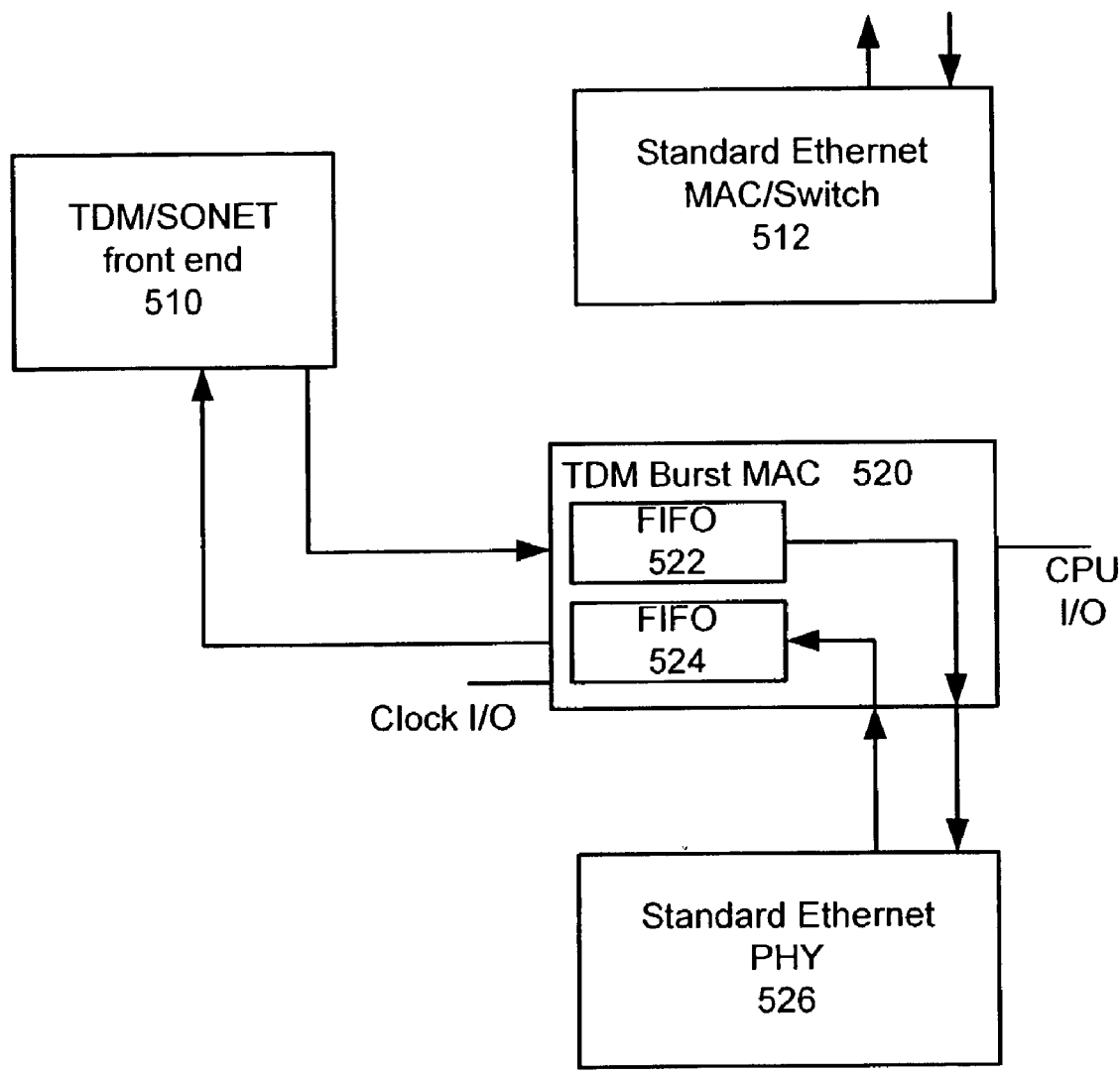

FIGS. 4 and 5 illustrate an Ethernet First Mile transport side at an outstation for supporting a TDM Burst MAC in accordance with the present invention. FIG. 4 illustrates a TDM Burst MAC 420 operating in a default bypass mode. The TDM Burst MAC 420 enables exchange of Ethernet frames between Standard Ethernet PHY 426 and Standard Ethernet MAC/Switch 412. During bypass mode, TDM/SONET front end 410 is disabled. This mode may operate during a TDM Burst MAC 802.3x pause timer (e.g., directed pause with X timer). Additionally, TDM transmit paths do not have to be synchronized with TDM receive paths.

FIG. 5 illustrates a TDM Burst MAC 520 operating in a TDM burst mode. TDM Burst MAC 520 enables transmission of TDM data flows (or TDM bursts) between Standard Ethernet PHY 526 and a TDM/SONET front end 510 via FIFO 522 and FIFO 524. During TDM burst mode, Standard Ethernet MAC/Switch 512 is disabled. This mode may operate during a Ethernet MAC 802.3x pause timer (e.g., multicast pause with Y timer).

Figure 6:
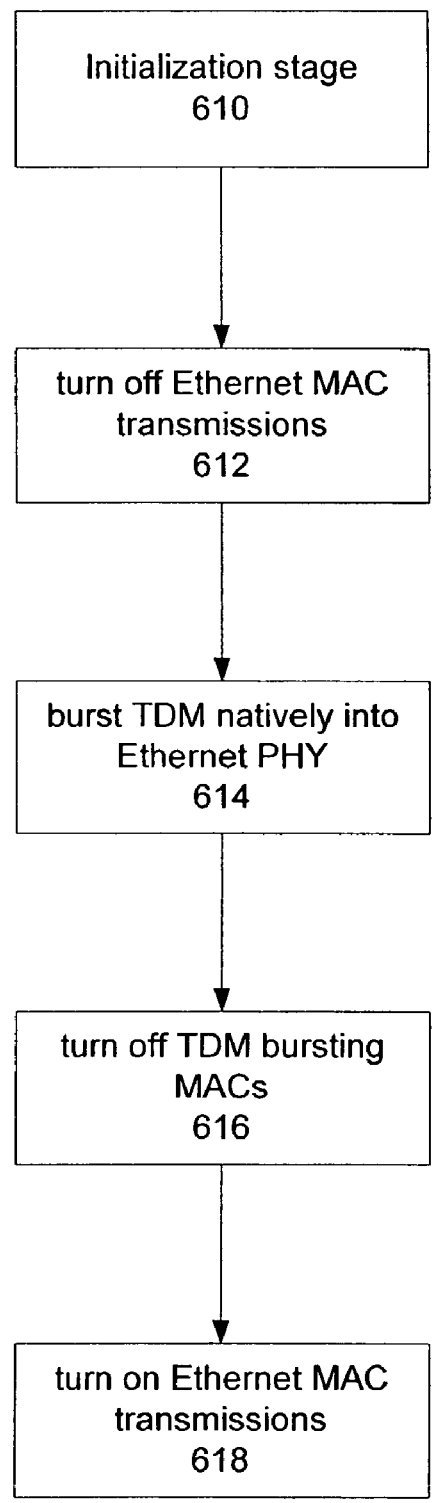
FIG. 6 is a flowchart for bursting TDM over Ethernet PHY in accordance with the present invention.

FIG. 6 is a flowchart for bursting TDM over Ethernet PHY in accordance with the present invention. At step 610, an initialization stage supports TDM Burst MAC in a default bypass mode. The TDM Burst MAC may be initialized to a normally off mode where a first directed pause to a TDM Burst MAC address may be received for transmission of Ethernet frames.

At step 612, Ethernet MAC transmissions may be turned off by using a 802.3x multicast pause signal with a timer value. The timer value may represent a time period for running the TDM Burst MAC plus an additional guard band time.

At step 614, TDM data flows may be bursted natively into an Ethernet PHY. The first directed pause signal pops thereby signaling TDM data flows to transmit. The multicast pause signal turns on the TDM Burst MAC to enable native TDM data flows stored in a buffer to burst at an Ethernet link speed into the Ethernet PHY.

At step 616, the TDM Burst MAC is turned off. TDM Burst MAC may be turned off by sending a second directed pause to a TDM Burst MAC address, along with an off timer value. In addition, a locally provisioned or fixed time value may be used to turn off the TDM Burst MAC. In another example, the multicasted timer may pop to switch off the TDM burst function and re-enable the bypass mode of the TDM Burst MAC.

At step 618, Ethernet MAC transmissions are turned on. When the multicast pause signal pops, a Standard Ethernet MAC resumes a normally on condition. The TDM Burst MAC is off and operates in a default bypass mode.

At a metro OE/SONET edge, the receiving TDM Burst MAC may spool the native TDM data flow directly into a SONET/SDH payload setup per a provisioning procedure.

Figure 7:
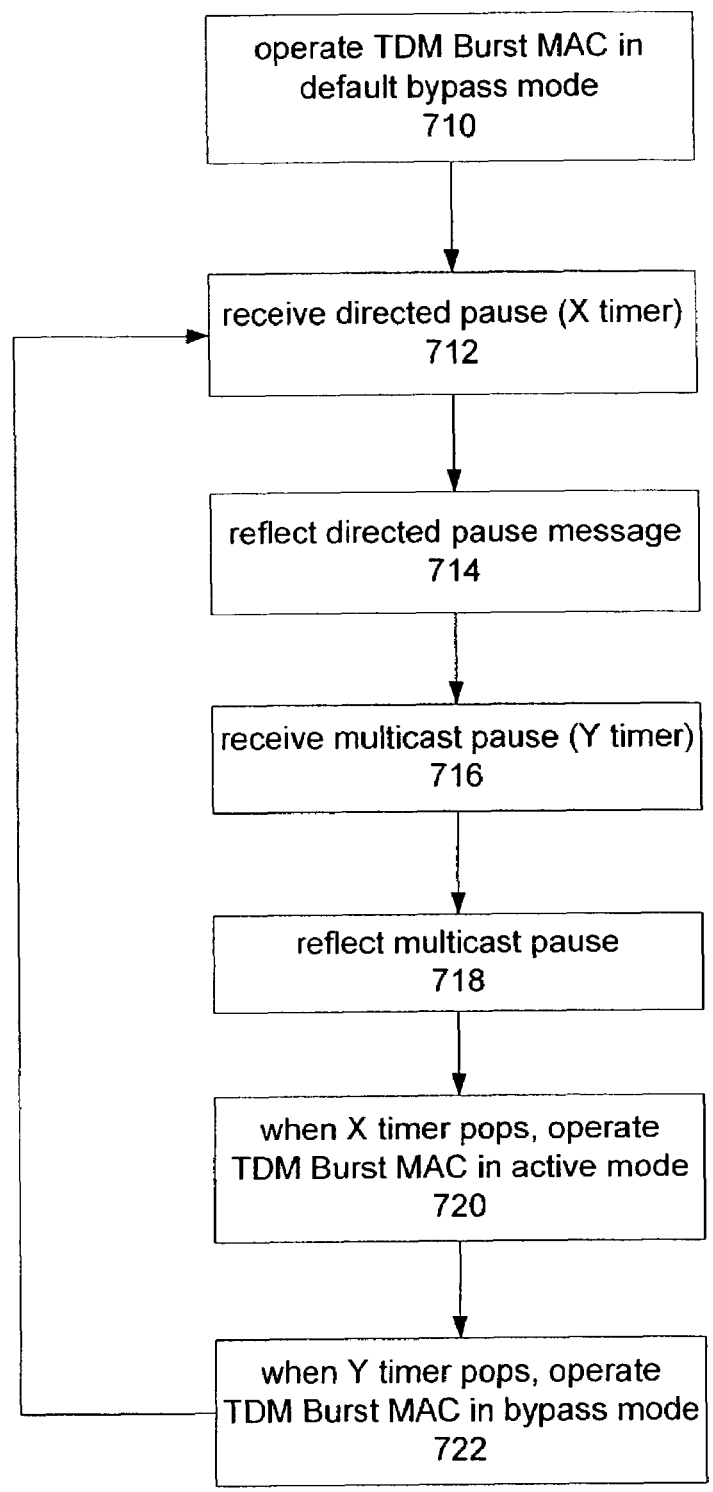
FIG. 7 is a flowchart for outstation processing of TDM data flows in accordance with the present invention.

FIG. 7 is a flowchart for outstation processing of TDM data flows in accordance with the present invention. As discussed above, burst signals may be incorporated in place of pause signals. At step 710, a TDM Burst MAC operates in a default bypass mode where Ethernet frames are passed through to a Standard Ethernet MAC/Switch during time t0 to t1. At step 712, a directed pause to a TDM Burst MAC address may be received at time t1. A timer value of X timer is loaded to keep the TDM Burst MAC in bypass mode until X timer pops at time t2. At step 714, a directed pause message containing information related to duration and other qualities associated with the directed pause is reflected upstream towards a head-end and directed to a head-end TDM Burst MAC address.

At step 716, prior to the X timer popping, a 802.3x multicast pause with a Y timer value is received at time t2. At step 718, a multicast pause message containing information related to duration and other qualities associated with the multicast pause is reflected to a head-end with an updated source address (SA). An outstation Standard Ethernet MAC disables during Y timer. At step 720, when the X timer pops, the TDM Burst MAC feeds downstream/receive bytes from the head-end into a Rx FIFO and sends Tx FIFO TDM bursts upstream to the head-end during time t2 to t3. The Rx FIFO transmits the data to a TDM/SONET interface at a line rate.

At step 722, when the Y timer pops at time t3, the Tx FIFO and Fx FIFO will stop feeding data to the TDM Burst MAC. Thus, the TDM Burst MAC operates in a bypass mode. A TDM burst cycle may start again at step 712, where another directed pause may be received at time t3.

Figure 8:
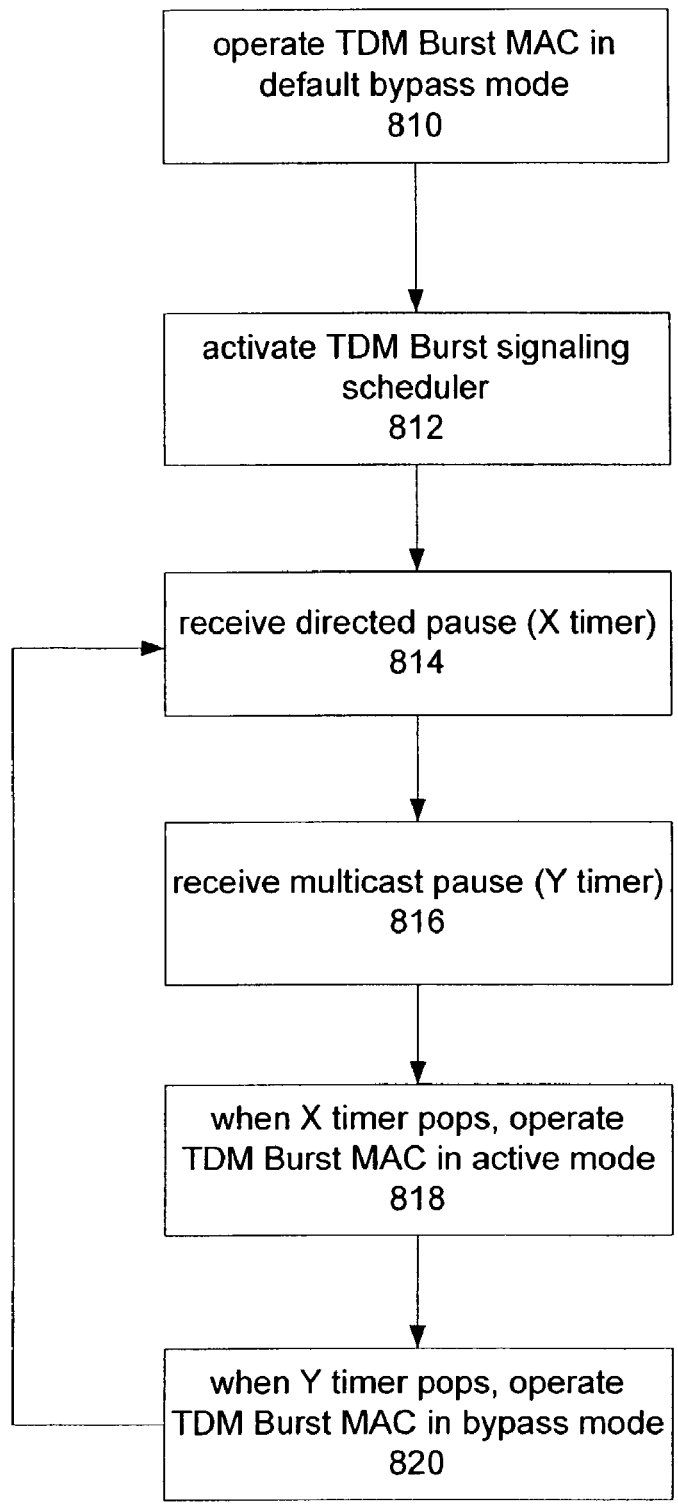
FIG. 8 is a flowchart for head-end processing of TDM data flows in accordance with the present invention.

FIG. 8 is a flowchart for head-end processing of TDM data flows in accordance with the present invention. At step 810, a TDM Burst MAC operates in a default bypass mode where Ethernet frames are passed through to a Standard Ethernet MAC/Switch at time T0. At step 812, a TDM Burst scheduler may be activated. The TDM Burst scheduler specifies a burst schedule of pause signals. At step 814, a directed pause to a TDM Burst MAC address may be received at time T1. A timer value of X timer is loaded to keep the TDM Burst MAC in bypass mode until X timer pops at time T2. The directed pause may be a reflection of a directed pause from an outstation, with an updated SA of the TDM Burst MAC.

At step 816, prior to the X timer popping, a 802.3x multicast pause with a Y timer value is received at time T2. The multicast pause may be a reflection of a multicast pause from an outstation, with an updated SA of the Ethernet MAC address. Head-end Standard Ethernet MAC disables during Y timer. At step 818, when X timer pops at time T2, the TDM Burst MAC feeds upstream/receive bytes from the outstation into a Rx FIFO and sends Tx FIFO TDM bursts downstream to the outstation during time T2 to T3, as shown by TDM Burst 348. The Rx FIFO transmits the data to a TDM/SONET interface at a line rate.

At step 820, when the Y timer pops at time T3, the Tx FIFO and Fx FIFO will stop feeding data to the TDM Burst MAC. Thus, the TDM Burst MAC operates in a bypass mode during time T3 to T4. A TDM burst cycle may start again at step 814, where another directed pause may be received at time T3.

The inventive aspects discussed above in relation to TDM data flows may be further applied to any byte stream media or other type of media. For example, other bursted native media data flows including TDM data flows, video data flows and/or any other digitized byte-oriented stream may be implemented by the present invention. In addition, the inventive aspects discussed above may be applied to a linear add/drop collector architecture (e.g., point to consecutive point) where Ethernet frames may be dropped into burst signal controlled timeslots.

According to another embodiment of the present invention, an add/drop burst MAC device may comprise at least two bursting ports wherein user side Ethernet bridge-like functions are integral with timeslotting functions thereby producing a tunable dedicated and shared timeslotted add/drop collector. According to another embodiment of the present invention, the add/drop burst MAC device may be implemented in a point to consecutive point environment.

Dedicated bandwidth options provide a best in class quality of service. A true "dedicated private line" service may be referred to as a leased line with dedicated timeslots. Through the use of shared timeslots, virtual private line services as well as conventional best effort services may be supported. According to an embodiment of the present invention, dedicated timeslots and shared timeslot allocations may be dynamically tuned thousands of times per second.

Figure 9:
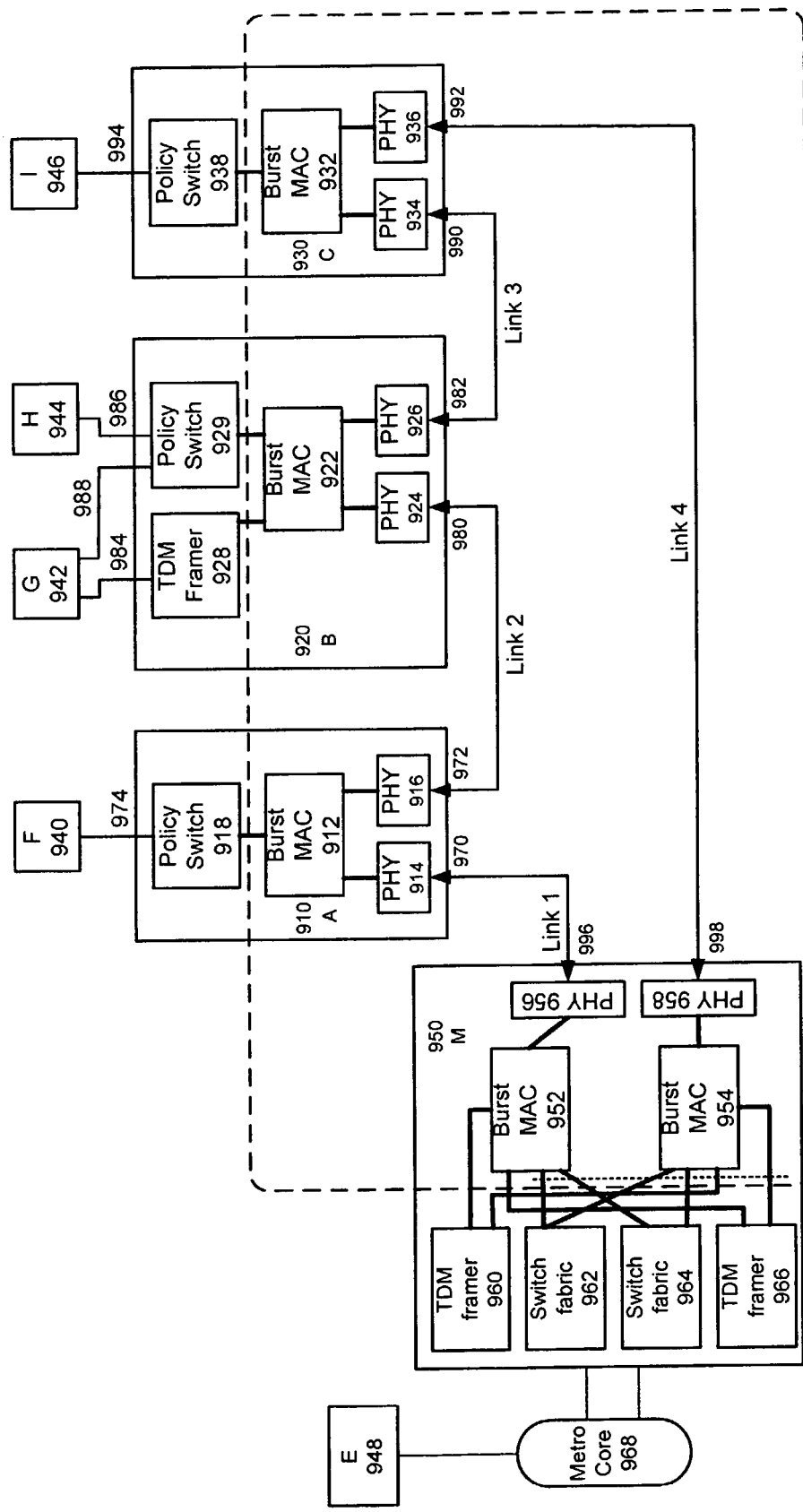
FIG. 9 is a diagram illustrating add/drop Burst MAC devices in a point to consecutive point environment in accordance with the present invention.

FIG. 9 is a diagram illustrating add/drop Burst MAC devices in a point to consecutive point environment in accordance with an embodiment of the present invention.

Node 910 may support a Burst MAC device 912 connected to a standard Ethernet physical layer hardware (PHY) 914 and a PHY 916. PHY 914 is connected to port 970 and PHY 916 is connected to port 972 for receiving and transmitting timeslotted information, data flows and other information. Policy switch 918 is connected to a user port 974 for receiving and transmitting information from CPE 940. Policy switch may refer to a conventional Ethernet switch/bridge with a feature for looking at other parts of a data packet other than an Ethernet address space, as well as upper layer of QoS and address space where data flows may be classified. Quality of service screening profiles and/or security/authorization screening profiles may be applied to the data flows. A policy switch may be easily leveraged to also classify flows into timeslots. Individual policies may be administered by an entity, such as a Metro provider and/or their customers directly through a web based access provisioning mechanism, for example. These policies may then be processed into raw data profiles and downloaded statically or dynamically into edge nodes where policy is applied to ingress flows.

Node 920 is an example of a four port Burst MAC with at least two user ports to individual CPEs. User ports 984 and 986 may be fed to a standard Ethernet switching fabric that may be equipped with policy enforcement on user ingress traffic. Node 920 may support a Burst MAC device 922 connected to a PHY 924 and a PHY 926. PHY 924 is connected to port 980 and PHY 926 is connected to port 992 for receiving and transmitting timeslotted information, data flows and other information. TDM framer 928 is connected to a user port 984 for receiving and transmitting information from CPE 942. Policy switch 929 is connected to a user port 986 for receiving and transmitting information from CPE 944 as well as a user port 988 for receiving and transmitting information from CPE 942.

Node 930 may support a Burst MAC device 932 connected to a PHY 934 and a PHY 936. PHY 934 is connected to port 990 and PHY 936 is connected to port 992 for receiving and transmitting timeslotted information, data flows and other information. Policy switch 938 is connected to a user port 994 for receiving and transmitting information from CPE 946.

The at least two ports facing standard Ethernet PHY hardware are timeslotted while the one or more user ports which may face an Ethernet switching fabric are non-timeslotted. For shared timeslotting, Ethernet switch/bridging functions may be used. Additional user ports may be added for native media byte stream bursting, such as TDM Burst function. In addition, for resiliency purposes, link aggregation functions may be used in a pair or more of resilient switch fabrics, such as node 950 which may use two burst MACs for enhanced fault tolerant ability.

Headend 950 may support one or more Burst MAC devices as shown by Burst MAC 952 which is connected to a PHY 956 and Burst MAC 954 which is connected to a PHY 958. PHY 956 is connected to headend port 996 and PHY 958 is connected to headend port 998. Each of TDM framer 960, Switch fabric 962, Switch fabric 964 and TDM framer 966 may be connected to Burst MAC 952 and/or Burst MAC 954. Each of TDM framer 960, Switch fabric 962, Switch fabric 964 and TDM framer 966 may be further connected to a Metro core 968 using technologies such as TDMoSONET, RPRMAC, EOS, MPLS, ATM, mesh or ring architectures, for example. The headend may support a burst scheduler for computing an add/drop burst schedule for scheduling timeslots. According to another embodiment, a distributed burst scheduler may be implemented in one or more nodes for headendless applications, as discussed in detail below.

Link 1 connects headend port 996 of headend 950 and port 970 of node 910; link 2 connects port 972 of node 910 to port 980 of node 920 and link 3 connects port 982 of node 920 to port 990 of node 930. Each link may be a timeslotted bi-directional link. Link 4 connects port 992 of node 930 to headend port 998 of headend node 950 wherein link 4 may be optionally timeslotted for resiliency and/or extra capacity. For example, link 4 may be left idle and function as a protection switch link. In addition, link 4 may be used for doubling traffic capacity. According to an embodiment of the present invention, link 4 may function as a standby link for detecting when link traffic fluctuates up and down. For example, if link 1 is impaired, link 4 may take over (e.g., switch over) where traffic may be reallocated. In addition, timeslot information in a bridging table, for example, may also be transferred appropriately. The bridge table may be automatically updated during a link failure condition to an alternate timeslot map.

Upstream generally refers to a direction towards a head end (e.g., node 950) or towards a metro core. Downstream generally refers to a direction towards a carrier managed CPE node, such as node 910, node 920 and 930. Upstream timeslots (e.g., TU) and downstream timeslots (e.g., TD) may be configured independently and/or asymmetrically. TDM bursting type timeslots may use symmetrical upstream and/or downstream allocation. According to an example of FIG. 9, TU1 represents a dedicated private line service (e.g., dedicated bandwidth) for node 910 (e.g., node A), port 974 (e.g., Af), sourced traffic, which may refer to traffic transmitted from a node (e.g., node 940) destined for a Metro core 968. As shown in FIG. 9, a subtending node 948 may be connected to Metro Core 968. TU2 represents a dedicated private line service (e.g., dedicated bandwidth) for node 920 (e.g., node B), port 984 (e.g., Bg), sourced traffic. TU3 represents a dedicated private line service (e.g., dedicated bandwidth) for node 920 (e.g., node B), port 986 (e.g., Bh), sourced traffic. TU4 represents a dedicated private line service (e.g., dedicated bandwidth) for node 930 (e.g., node C), port 994 (e.g., Ci), sourced traffic. TU5 represents a shared timeslot which may be used for any best effort classified packets.

In addition, TD1 represents a dedicated private line service (e.g., dedicated bandwidth) for node 910 (e.g., node A), port 974 (e.g., Af), and switched through node 950 (e.g., node M). For example, a user node 948 may send traffic into a Metro Core 968 where the traffic is destined for a CPE (e.g, CPE 940) and may thus pass through Headend 950. TD2 represents a dedicated private line service (e.g., dedicated bandwidth) for node 920 (e.g., node B), port 984 (e.g., Bg), switched through node 950 (e.g., node M). TU2 and TD2 in this example may represent a native TDM burst that by nature of TDM may have a symmetrical bandwidth allocation by a burst scheduler. TD3 represents a dedicated private line service (e.g., dedicated bandwidth) for node 920 (e.g., node B), port 986 (e.g., Bh) and switched through node 950 (e.g., node M). TD4 represents a dedicated private line service (e.g., dedicated bandwidth) for node 930 (e.g., node C), port 994 (e.g., Ci) and switched through node 950 (e.g., node M). TD5 represents a shared timeslot which may be used for lower quality of service or best effort classified packets, for example. TD6 represents a shared timeslot for control plan traffic that signals timeslot arrangements. Shared timeslot traffic may be switched and queued per standard Ethernet conventions at each hop on an add/drop collector that is in a path to a final destination.

The add/drop burst MAC of the present invention provides multi-port time switch functionality, point-to-point Ethernet multiplexing, native media burst buffer (e.g., TDM Burst), native multi-media burst timeslotting and a modified bridge table that maps egress queues to timeslots. According to one example, 802.1 p/q like classification may be used to map user flows to one or more timeslots.

Figure 10:
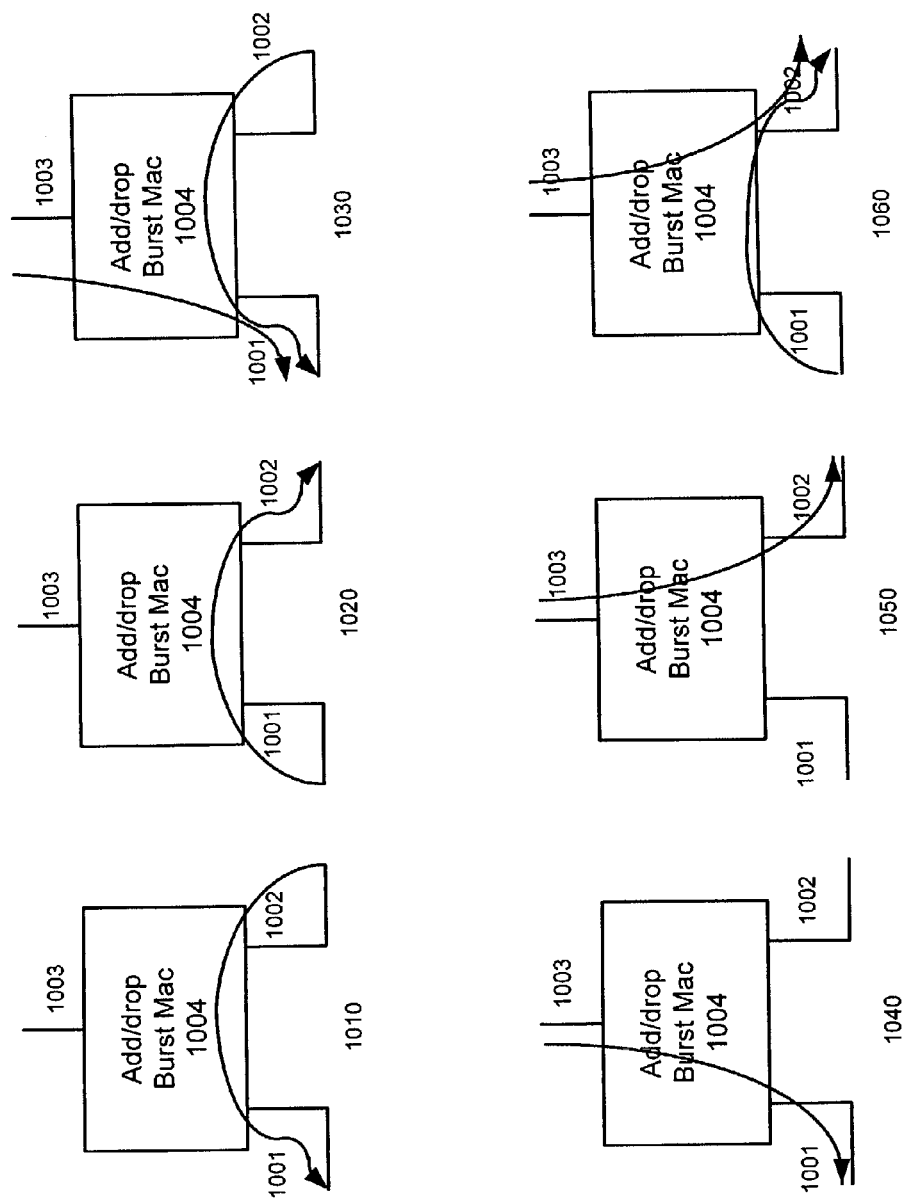
FIG. 10 is a diagram illustrating various timeslot paths in accordance with the present invention.
Figure 14:
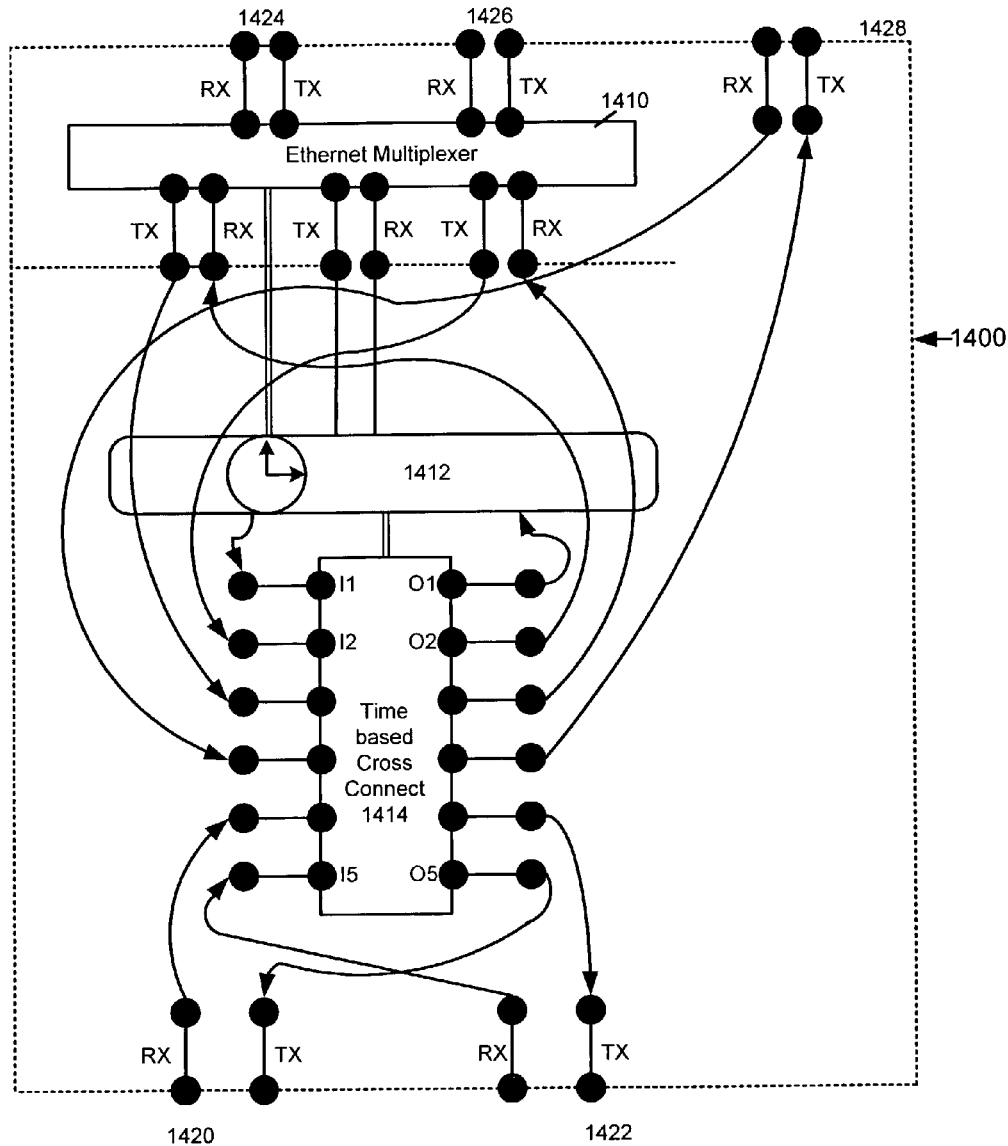
FIG. 14 is a detailed view of an add/drop Burst MAC device in accordance with the present invention.

FIG. 10 is a diagram illustrating various timeslot paths in accordance with an embodiment of the present invention. In these examples, add/drop Burst MAC device 1004 comprises port 1001, port 1002 and user port 1003. The add/drop Burst MAC device 1004 may support shared and dedicated slotting options. Ethernet switch techniques, such as bridge tables, may be implemented. Timeslot path 1010 illustrates an upstream path from port 1002 to port 1001 wherein the upstream path is a tandem timeslot path. A tandem path may refer to a timeswitch path (e.g., 1010 and 1020 in FIG. 10) that does not use a bridge table. Instead, a chip (e.g., chip 1414 in FIG. 14 described below) may perform a time based setup of a direct crisscross of RX and TX paths of the two add/drop ports 1420 and 1422. A tandem path may be a direct traffic path from port 970 to port 972 of node 910, for example. In another example, a multiplexed path does use a bridge table in a packet forwarding path. In FIG. 14, time based cross connect 1414 may be setup in time to move packets from an add/drop port up through an Ethernet multiplexer 1410 to perform a bridge type lookup function, for example, and then out to an assigned port or timeslot. A multiplexed path may be a traffic path from port 970 to port 972 of node 910, for example, but in a shared timeslot context, as shown by 1060 in FIG. 10.

Nodes that do not participate in a partially shared timeslot may be in tandem switched mode during this timeslot. Timeslot path 1020 illustrates a downstream path from port 1001 to port 1002 wherein the downstream path is a tandem timeslot path. Timeslot path 1030 illustrates a shared upstream timeslot path from port 1002 to port 1001 multiplexed into a second upstream shared timeslot path from user port 1003 to port 1001. In another example, timeslot paths illustrated in 1030 may also flow downstream. In particular, a downstream shared timeslot path may flow from port 1001 to port 1002 multiplexed into a second downstream shared timeslot path from port 1001 to user port 1003.

Timeslot path 1040 illustrates an upstream path from user port 1003 to port 1001. In another example, the path illustrated in 1040 may also flow downstream. In particular, a downstream path may flow from port 1001 to user port 1003. Timeslot path 1050 illustrates a downstream path from user port 1003 to port 1002. In another example, the path illustrated in 1050 may also flow upstream. In particular, an upstream path may flow from port 1002 to user port 1003.

Timeslot path 1060 illustrates a downstream shared timeslot path from port 1001 to port 1002 multiplexed into a second downstream shared timeslot path from user port 1003 to port 1002. In another example, timeslot paths illustrated in 1060 may also flow upstream. In particular, a upstream shared timeslot path may flow from port 1002 to port 1001 multiplexed into a second upstream shared timeslot path from port 1002 to user port 1003.

Figure 11:
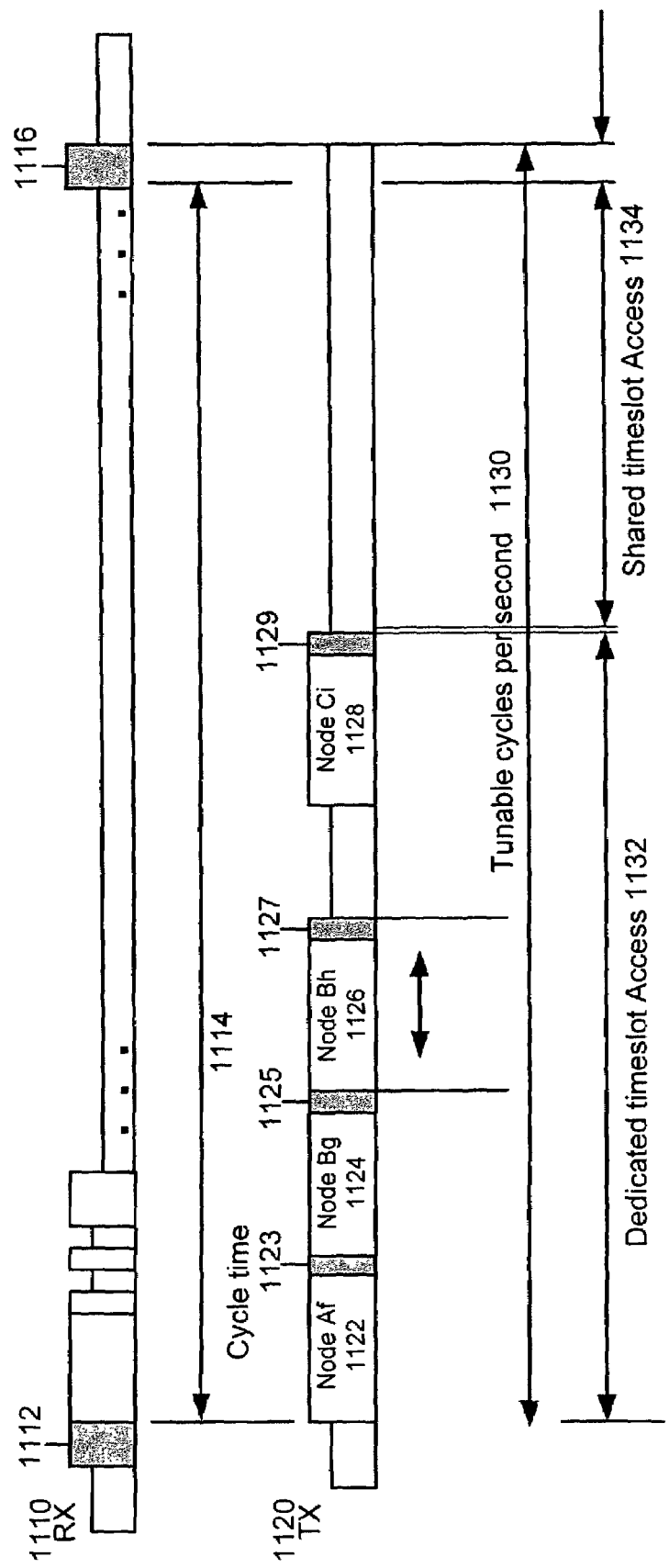
FIG. 11 is a diagram illustrating add/drop Burst MAC timeslot signals in accordance with the present invention.

FIG. 11 is a diagram illustrating add/drop Burst MAC timeslot signals in accordance with an embodiment of the present invention. In this example, signals illustrated in FIG. 11 may be received by a port, such as port 970, 972, 980, 982, 990, 992 as well as headend port 996 or 998. Each port may function as a receive port and a transmit port.

At a receive port 1110 of a node, an Ethernet timeslot control window 1112 may be reserved as a listen-only shared timeslot for receiving timeslot control information. Timeslot control information may be received as a multicast timeslot signal, which may include a precision time-stamping based clock distribution ability. Add/drop outstations and the headend node may be precision timed with a relative or absolute clock (or other time tracking device). The level of time precision required (or preferred) among the outstations and headend node may depend on timeslot signaling implementation and add/drop link speed, for example. In addition, timeslot control information may be received as a set of individually directed messages to each add/drop outstation within the timeslot control window 1112. For example, timeslot control window 1112 may occur between each dedicated burst timeslot and/or at a start of shared timeslots as well as at a start of a multicast or a plurality of directed unicast signals. Timeslot control information may provide timeslotting information, such as which node may send data packets, when each node may send data packets and/or how long each node may send data packets. A cycle time 1114 may be occur thousands of times a second. 1116 represents another shared timeslot for burst control listen-only purposes.

At a transmit port 1120 of the node, data packets may be transmitted in accordance with the received timeslot control information. In this example, data packet 1122 represents a data packet addressed to CPE F 940 via node A 910. Data packet 1124 represents a data packet addressed to CPE G 942 via node B 920. Data packet 1126 represents a data packet addressed to CPE H 944 via node B 920. Data packet 1128 represents a data packet addressed to CPE I 946 via node C 930. A delimiter message may be transmitted at an end of a timeslot burst. Optional burst delimiter messages 1123, 1125, 1127 and 1129 may be implemented for optimizing bandwidth efficiency.

Tunable cycles per second is represented by 1130. Dedicated timeslot access 1132 and shared timeslot access 1134 may be supported at a port. Dedicated timeslot access 1132 may support tunable dedicated private line services. A portion, none or all of the cycle time may be allocated to dedicated access. Dedicated timeslot access 1132 may represent certain types of user traffic. Shared timeslot access 1134 may support tunable virtual private line services. A portion, none or all of the cycle time may be allocated to shared access. The dedicated timeslot access and the shared timeslot access may be dynamically adjustable per cycle.

A system supporting a plurality of add/drop Burst MAC devices in a point to consecutive point environment of the present invention may be headended or headendless. An example of an headended system is shown in FIG. 9. Headendless may be a daisy chain with endpoints attached to differing Metro core nodes, for example. Headendless may use carrier managed premise outstation add/drop endpoints, such as node 1210 and node 1230 in FIG. 12, as a timeslot burst scheduling endpoints. In a headendless application, a distributed burst scheduler may be implemented in one or more nodes.

Figure 12:
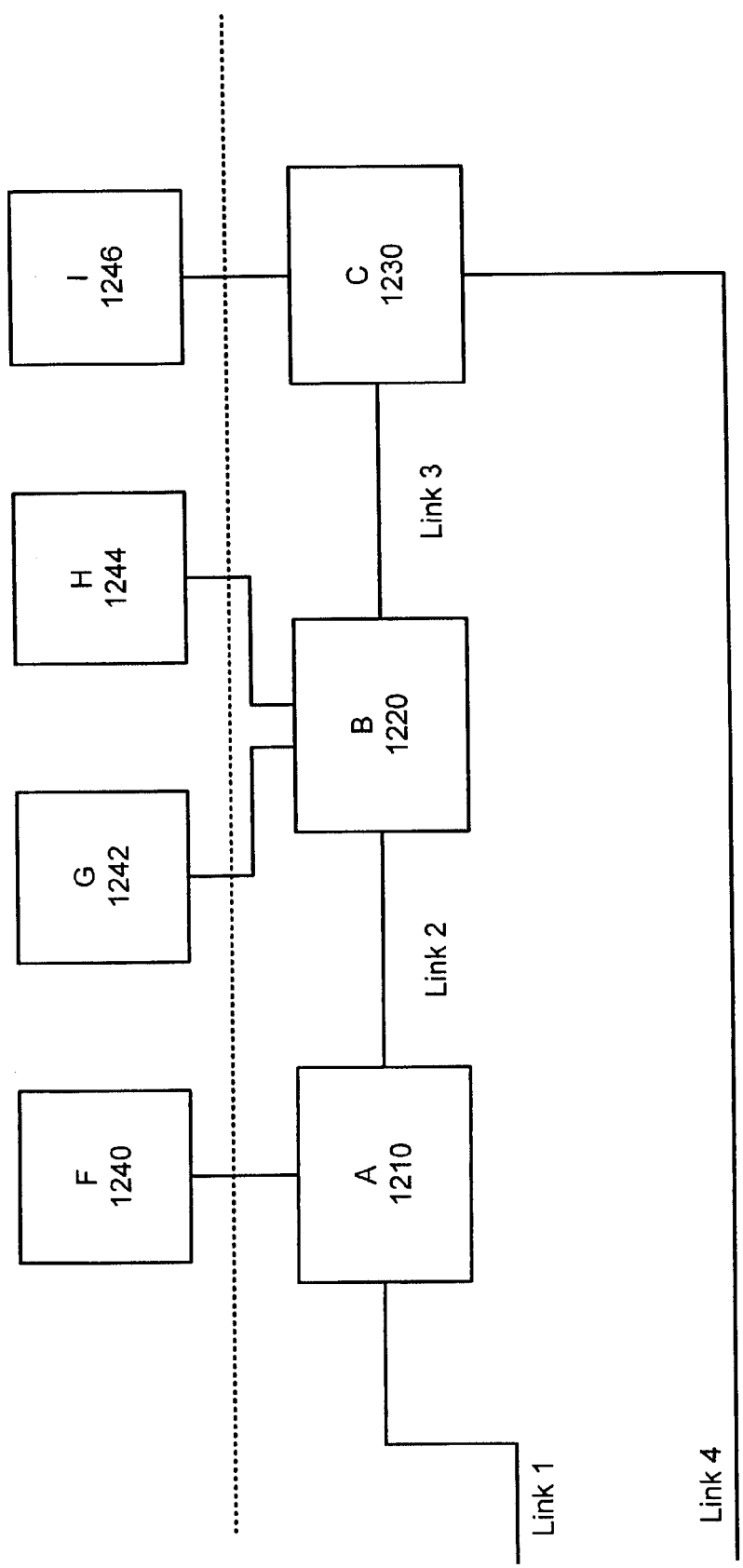
FIG. 12 is an example of a headendless add/drop burst MAC system in accordance with the present invention.

FIG. 12 is an example of a headendless add/drop burst MAC system in accordance with an embodiment of the present invention. In this example, node 1210 is connected to CPE 1240, node 1220 is connected to CPE 1242 and CPE 1244, and node 1230 is connected to CPE 1246. Timeslotted downstream towards a CPE add/drop device may be limited to link 2 and link 3 in this example. Timeslotted upstream may occur on all links. A timeslot control signal scheduler may be sourced from node 1210 and/or node 1230 as well as other nodes. In this example, link 1 and link 4 upstream (towards a Metro backhaul) may be timeslotted where a conventional point-to-point Ethernet port in a metro edge device may terminate without being timeslot aware. In FIG. 12, link 1 and link 4 downstream are not timeslotted, but rather statistically multiplexed whereas link 1 and link 4 upstream are timeslotted and become more valuable as the number of outstations is increased (e.g., in the tens) in terms of quality of service and security when compared to a conventional switched Ethernet outstation, for example. In addition, link 1 and link 4 may be transmitting to differing Metro edge devices. According to another example, link 4 may be an optional link. A designated link, such as link 4, may be used for load-shared extra capacity functionality as well as for standby functionality. Load-shared functionality may enable shared timeslots on a first link and a second link to use dedicated timeslots thereby providing improved jitter performance for dedicated timeslot services by reducing the cycle time. For example, link 1 may be setup for dedicated only timeslots and link 4 may be setup for shared timeslots. Standby functionality may use timeslot map hot switchover techniques synchronized among the add/drop outstations.

FIG. 13 is an example of a bridge table with timeslot mapping information in accordance with an embodiment of the present invention. The bridge table provides mapping information, such as destination 1310, port 1312, filters/mask 1314 as well as timeslot identifier filter 1316. In this exemplary bridge table for an outstation node 910 (e.g., node A), destination may be Headend 950 (e.g., node Me where node e is illustrated as node 948 in FIG. 9) which may be sent via port 970 (e.g., A1). L2, L3, L4 filters/mask may refer to policy and classification concepts where these parameters in a packet may be used in addition to Ethernet address space based conventional bridging so as to isolate a user specific video flow that may be assigned to a dedicated timeslot by looking in a Layer 4 User Datagram Protocol (UDP) port number identifier, for example, as part of a multiplexing packet forwarding logic. Timeslot identifier filter is identified as TU1 which represents a dedicated private line service (e.g., dedicated bandwidth) for Node A 910, user port Af (e.g., CPE 940), sourced traffic. In another example, two (or more) timeslot filter columns may be implemented. For example, one column may include timeslot id for link 1 active and another column may include link 1 failure or link 4 active where timeslot maps in each outstation may switchover to link 4. Variations are possible for each outstation switchover approach.

TU represents an upstream timeslot on an add/drop collector link. Another destination may be node 910, CPE 940 (e.g., Af) which may be sent via user port 974 (e.g., A3). As shown under column 1314, filtering may be allowed. Timeslot identifier filter is indicated as being "not applicable" which may refer to a situation where a bridge table lookup is used for a destination address (e.g., Af) and the packet may egress onto a transmit path (e.g., 974) towards a node (e.g., CPE F 940) via a conventional Ethernet port.

Another destination may be node 920, CPE 942 (e.g., Bg) and node 920, CPE 944 (e.g., Bh) which may be sent via port 972 (e.g., A2). This case may refer to a scenario such as 1050 and 1060 in FIG. 10. For example, 1001 originated flows to 1002 should not be allowed to be re-filtered as they already are on add/drop link 1. However, the 1003 path may be filtered relative to node 910. Thus, filtering is allowed for CPE 940 (e.g., F) originated flows from user port 974 but not allowed for port 970 originated flows from headend 950 via link 1. Timeslot identifier filter is indicated as being TD5 for both destinations which represents a "shared" timeslot which may be used for any best effort classified packets. TD represents a downstream timeslot on an add/drop collector link.

Another destination may be node 930, CPE 946 (e.g., Ci) which may be sent via port 972 (e.g., A2). Filtering may be allowed from CPE 940 (e.g., F) via user port 974 and not allowed if from headend M via port 970. Timeslot identifier filter is indicated as being TD5 which represents a "shared" timeslot which may be used for any best effort classified packets.

FIG. 14 is a detailed view of an add/drop Burst MAC device 1400 in accordance with an embodiment of the present invention. Add/drop burst ports are shown as port 1420 and port 1422 which may receive and transmit data flows. User ports are shown as 1424, 1426 and 1428 which may also receive and transmit data flows. User ports 1424 and 1426 may be connected to one or more application Ethernet switch fabrics. User port 1428 may be connected to an alternate media burst/deburst buffer. Other user facing interfaces (e.g., Ethernet or alternate medias) may be implemented. None, a portion or all of an Ethernet Multiplexer 1410 may be allocated as dedicated and/or shared. Time based cross connect 1414 may receive and transmit information from each of the ports. A timing device 1412 may be used to properly timeslot data flows and other packets.

Control complex may support a timeslot burst scheduler, for example. As a headend control complex, the burst scheduler may send timeslot controls and use other information locally as well to process upstream and downstream flows on link 1 and link 4 (headend 950). As an outstation control complex reception of timeslot control information may be processed, timeslot map tables may be constructed relevant to the ports and user on a local node. 1412 may be integral with an Ethernet multiplexer 1410 forwarding process shown in FIG. 14. Timeslot identifier enhanced bridge table may be used to store timeslot identifier maps, as described in FIG. 13 above. When cross connect 1414 is in a tandem add/drop configuration (e.g., when I5 connects to O5 and I4 connects to O4, 1412 and 1410 do not process tandem packets), the Ethernet multiplexer may queue data flows (e.g. packets) into timeslot mapped queues.

Timeslotted add/drop Ethernet enables separation of users on an aggregated Ethernet add/drop; QoS feature ability of dedicated bandwidths rather than conventional statistically multiplexed shared and re-queued bandwidths; and Metro delivered precision timing features into premise locations for time sensitive applications re-use, thereby achieving integration of timeslotting and multiplexing concepts of Sonet/SDH into a layer 2 Ethernet infrastructure.

At this point it should be noted that implementing a tunable add/drop collector having at least two bursting ports for supporting dedicated and shared timeslotting in accordance with the present invention as described above typically involves the processing of input data and the generation of output data to some extent. This input data processing and output data generation may be implemented in hardware or software. For example, specific electronic components may be employed in a MAC device or similar or related circuitry for implementing the functions associated with implementing a tunable add/drop collector having at least two bursting ports for supporting dedicated and shared timeslotting in accordance with the present invention as described above. Alternatively, one or more processors operating in accordance with stored instructions may implement the functions associated with implementing a tunable add/drop collector having at least two bursting ports for supporting dedicated and shared timeslotting in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for implementing a tunable add/drop collector for supporting dedicated and shared timeslotting in a network having a plurality of nodes, the method comprising the steps of:
   computing an add/drop burst schedule for scheduling timeslots wherein the timeslots comprise a plurality of dedicated timeslots and a plurality of shared timeslots;
   receiving timeslot control information at one or more nodes; and
   transmitting data flows from the one or more nodes via at least two timeslotted ports in accordance with at least the timeslot control information and the add/drop burst schedule.

2. The method of claim 1, wherein the timeslotted information is received by a directed unicast message intended for a single node.

3. The method of claim 1, wherein the timeslotted information is received by a multicast message intended to be received by a plurality of nodes.

4. The method of claim 1, wherein each of the one or more nodes comprise a Burst MAC device.

5. The method of claim 1, wherein the plurality of dedicated timeslots and the plurality of shared timeslots are dynamically tunable.

6. The method of claim 1, wherein the at least two timeslotted ports are connected to a headend supporting TDMoSONET/SDH.

7. The method of claim 1, wherein the tunable add/drop collector resides in a point to consecutive point environment.

8. The method of claim 1, wherein the data flows are transmitted at least in part in accordance with a bridge table wherein the bridge table comprises timeslot information.

9. The method of claim 8, wherein the bridge table is automatically updated during a link failure condition to an alternate timeslot map.

10. A processor readable storage media containing code to execute a computer process for performing the method as recited in claim 1.

11. A system for implementing a tunable add/drop collector for supporting dedicated and shared timeslotting in a network having a plurality of nodes, the system comprising:
    a burst scheduler for computing an add/drop burst schedule for scheduling timeslots wherein the timeslots comprise a plurality of dedicated timeslots and a plurality of shared timeslots;
    one or more nodes for receiving timeslot control information; and
    at least two timeslotted ports for transmitting data flows from the one or more nodes in accordance with at least the timeslot control information and the burst scheduler.

12. The system of claim 11, wherein the timeslotted information is received by a directed unicast message intended for a single node.

13. The system of claim 11, wherein the timeslotted information is received by a multicast message intended to be received by a plurality of nodes.

14. The system of claim 11, wherein each of the one or more nodes comprise a Burst MAC device.

15. The system of claim 11, wherein the plurality of dedicated timeslots and the plurality of shared timeslots are dynamically tunable.

16. The system of claim 11, wherein the at least two timeslotted ports are connected to a headend supporting TDMoSONET/SDH.

17. The system of claim 11, wherein the tunable add/drop collector resides in a point to consecutive point environment.

18. The system of claim 11, wherein the data flows are transmitted at least in part in accordance with a bridge table wherein the bridge table comprises timeslot information.

19. The system of claim 18, wherein the bridge table is automatically updated during a link failure condition to an alternate timeslot map.

20. An article of manufacture for implementing a tunable add/drop collector for supporting dedicated and shared timeslotting in a network having a plurality of nodes, the article of manufacture comprising:
    at least one processor readable storage medium; and
    instructions carried on the at least one processor readable storage medium;
    wherein the instructions are configured to be readable from the at least one processor readable storage medium by at least one processor and thereby cause the at least one processor to operate so as to:
    compute an add/drop burst schedule for scheduling timeslots wherein the timeslots comprise a plurality of dedicated timeslots and a plurality of shared timeslots;
    receive timeslot control information at one or more nodes; and
    transmit data flows from the one or more nodes via at least two timeslotted ports in accordance with at least the timeslot control information and the add/drop burst schedule.

* * * * *